United States Patent
Bearden et al.

(12) 
(10) Patent No.: US 6,490,723 B1
(45) Date of Patent: Dec. 3, 2002

(54) METHOD AND SYSTEM FOR INSTALLING FILES IN A COMPUTING SYSTEM

(75) Inventors: Brian S. Bearden, Austin, TX (US); Srinivasa R. Gumbula, Austin, TX (US); James P. McGlothlin, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 09/451,159

(22) Filed: Nov. 30, 1999

(51) Int. Cl.⁷ ............................................. G06F 9/455
(52) U.S. Cl. ........................ 717/174; 717/169; 717/177
(58) Field of Search ................................ 717/168, 173, 717/174, 177, 178, 169; 707/203, 511

(56) References Cited

U.S. PATENT DOCUMENTS

| | | | |
|---|---|---|---|
| 5,970,252 A | * 10/1999 | Buxton et al. | 717/166 |
| 6,009,525 A | * 12/1999 | Horstmann | 713/200 |
| 6,049,671 A | * 4/2000 | Slivka et al. | 717/168 |
| 6,151,708 A | * 11/2000 | Pedrizetti et al. | 717/173 |
| 6,167,567 A | * 12/2000 | Chiles et al. | 717/168 |
| 6,216,175 B1 | * 4/2001 | Sliger et al. | 717/169 |
| 6,256,773 B1 | * 7/2001 | Bowman-Amuah | 717/121 |
| 6,263,491 B1 | * 7/2001 | Hunt | 717/130 |
| 6,266,654 B1 | * 7/2001 | Schull | 705/58 |
| 6,266,811 B1 | * 7/2001 | Nabahi | 717/174 |
| 6,347,398 B1 | * 2/2002 | Parthasarathy et al. | 717/174 |
| 6,363,486 B1 | * 3/2002 | Knapton, III | 713/200 |
| 6,367,075 B1 | * 4/2002 | Kruger et al. | 717/169 |
| 6,418,555 B2 | * 7/2002 | Mohammed | 717/169 |
| 6,434,744 B1 | * 8/2002 | Chamberlain et al. | 717/168 |

OTHER PUBLICATIONS

Hicks et al, "Dynamic software updating", ACM PLDI pp 13–23, 2001.*

Estublier et al. "Foundations of enterprise software deployment", IEEE SW Maint. and ReEng. Proc. 4th Europ. Conf. pp 65–73, 2000.*

Rauch et al, "Partition repositories for partition cloning OS independent software maintenance in large cluser of PCs", IEEE, 233–242, 2000.*

* cited by examiner

*Primary Examiner*—Anil Khatri
(74) *Attorney, Agent, or Firm*—Haynes and Boone, LLP

(57) ABSTRACT

In a computing system, at least one computer-readable medium is for storing information. The information includes at least one installation file. The installation file includes at least one first instruction and at least one table. Also, the information includes at least one programmable file. The programmable file includes at least one second instruction. The programmable file is specified by the first instruction. A computing device is for executing an installation program in response to the installation file for installing at least a portion of the information onto the computing system. In response to the first instruction, the computing device executes the programmable file for revising the table in response to which the computing device executes the installation program.

24 Claims, 3 Drawing Sheets

METHOD AND SYSTEM FOR INSTALLING FILES IN A COMPUTING SYSTEM

BACKGROUND

The disclosures herein relate in general to information processing systems and in particular to a method and system for installing files in a computing system.

An installation file (e.g. an .MSI file for Microsoft Windows Installer software) can specify a process for installation of an associated computer software application in a computing system (e.g. on a hard disk of the computing system). According to a previous technique, in order to revise (e.g. customize) the installation process, the installation file is revised before initiating the installation process for the installation file's associated software application. Nevertheless, a shortcoming of such a technique is that individual revision of a large number of installation files (especially before initiating the installation processes) is tedious and inefficient Accordingly, a need has arisen for a method and system for installing files in a computing system, in which various shortcomings of previous techniques are overcome. More particularly, a need has arisen for a method and system for installing files in a computing system, in which an installation process can be revised (e.g. customized) without always individually revising an installation file before initiating the installation process for the installation file's associated software application.

SUMMARY

One embodiment, accordingly, provides for at least one computer-readable medium for storing information in a computing system. The information includes at least one installation file. The installation file includes at least one first instruction and at least one table. Also, the information includes at least one programmable file. The programmable file includes at least one second instruction. The programmable file is specified by the first instruction. A computing device is for executing an installation program in response to the installation file for installing at least a portion of the information onto the computing system. In response to the first instruction, the computing device executes the programmable file for revising the table in response to which the computing device executes the installation program.

A principal advantage of this embodiment is that (a) various shortcomings of previous techniques are overcome, and (b) an installation process can be revised (e.g. customized) without always individually revising an installation file before initiating the installation process for the installation file's associated software application.

DETAILED DESCRIPTION

Figure 1:
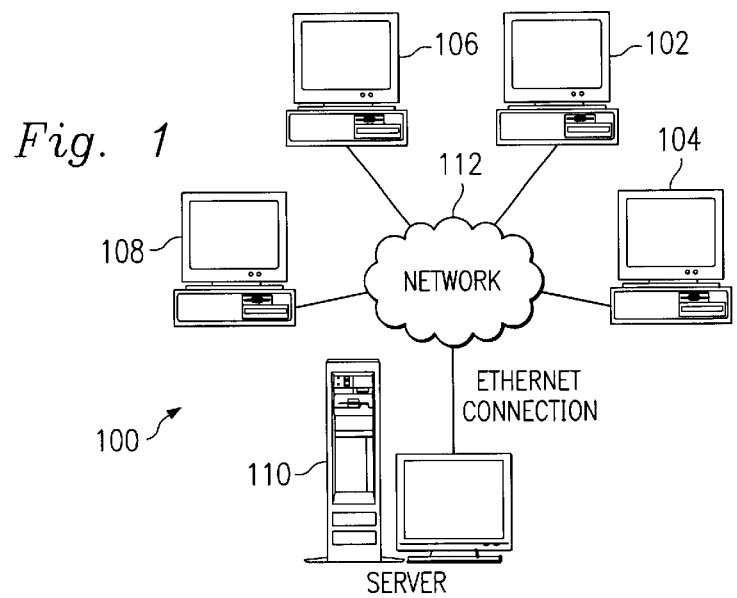
FIG. 1 is a block diagram of a system according to the illustrative embodiment.

FIG. 1 is a block diagram of a system, indicated generally at 100, according to the illustrative embodiment. System 100 includes (a) computing systems 102, 104, 106 and 108, and (b) a server 110 (which is also a computing system) for installing software onto computing systems 102, 104, 106 and 108 as part of a build-to-order process, as discussed further hereinbelow. Further, system 100 includes a conventional "ethernet" network 112.

Each of computing systems 102, 104, 106 and 108, and server 110 includes respective network interface circuitry for communicating with network 112 (i.e. outputting information to, and receiving information from, network 112), such as by transferring information (e.g. instructions, data, signals) between such computing system (or server) and network 112. As shown in FIG. 1, server 110 is coupled through network 112 to each of computing systems 102, 104, 106 and 108. Accordingly, through network 112, server 110 communicates with computing systems 102, 104, 106 and 108, and vice versa.

For clarity, FIG. 1 depicts four computing systems 102, 104, 106 and 108, although system 100 may include additional computing systems. For explanatory purposes, computing system 102 is a representative one of computing systems 102, 104, 106 and 108. Each of computing systems 102, 104, 106 and 108, and server 110 includes at least one respective computing device (e.g. computer) for executing a respective process and performing respective operations (e.g. processing and communicating information) in response thereto as discussed further hereinbelow. Each such computing system and computing device is formed by various electronic circuitry components.

In the illustrative embodiment, the computing devices of computing systems 102, 104, 106 and 108, are personal computers (e.g. IBM-compatible personal computers ("PCs")) that execute Microsoft Windows operating system ("OS") software. Also, in the illustrative embodiment, the computing device of server 110 is a server computer that executes Microsoft Windows NT OS software. Alternatively, any one or more of the computing devices of system 100 is any type of computer that executes any type of OS. All Microsoft products identified herein are available from Microsoft Corporation, One Microsoft Way, Redmond, Wash. 98052-6399, telephone (425) 882-8080.

Figure 2:
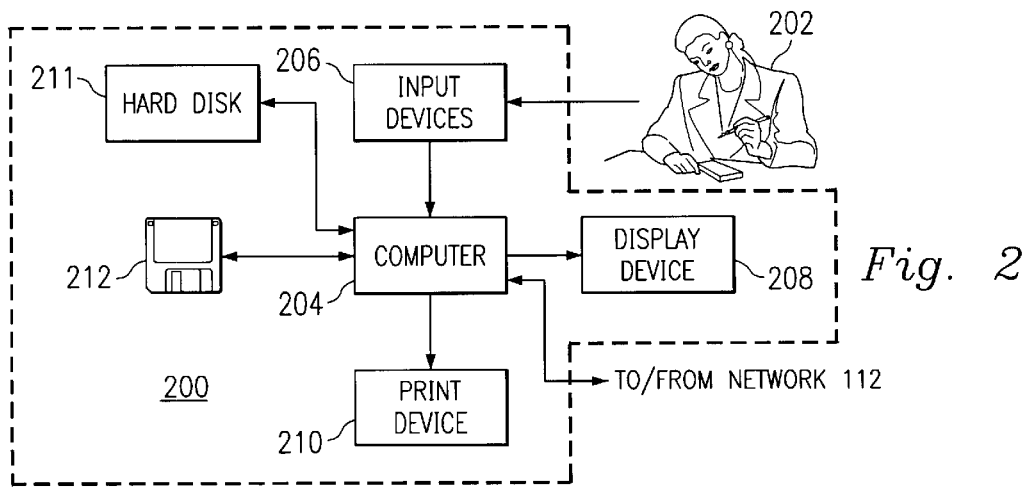
FIG. 2 is a block diagram of a representative one of the computing systems of the system of FIG. 1.

FIG. 2 is a block diagram of a representative one of the computing systems of system 100. Such representative computing system is indicated by dashed enclosure 200. Each of the computing systems of system 100 operates in association with a respective human user. Accordingly, in the example of FIG. 2, computing system 200 operates in association with a human user 202, as discussed further hereinbelow.

As shown in FIG. 2, computing system 200 includes (a) input devices 206 for receiving information from human user 202, (b) a display device 208 (e.g. a conventional electronic cathode ray tube ("CRT") device) for displaying information to user 202, (c) a computer 204 for executing and otherwise processing instructions, (d) a print device 210 (e.g. a conventional electronic printer or plotter), (e) a nonvolatile storage device 211 (e.g. a hard disk drive or other computer-readable medium (or apparatus), as discussed further hereinbelow) for storing information, (f) a computer-readable medium (or apparatus) 212 (e.g. a portable floppy diskette) for storing information, and (g) various other electronic circuitry for performing other operations of computing system 200.

For example, computer 204 includes network interface circuitry for communicating between computer 204 and network 112. As shown in FIG. 2, computer 204 is connected to network 112, input devices 206, display device 208, print device 210, storage device 211, and computer-readable medium 212.

For example, in response to signals from computer 204, display device 208 displays visual images, and user 202 views such visual images. Moreover, user 202 operates input devices 206 in order to output information to computer 204, and computer 204 receives such information from input devices 206. Also, in response to signals from computer 204, print device 210 prints visual images on paper, and user 202 views such visual images.

Input devices 206 include, for example, a conventional electronic keyboard and a pointing device such as a conventional electronic "mouse", rollerball or light pen. User 202 operates the keyboard to output alphanumeric text information to computer 204, and computer 204 receives such alphanumeric text information from the keyboard. User 202 operates the pointing device to output cursor-control information to computer 204, and computer 204 receives such cursor-control information from the pointing device.

Figure 3:
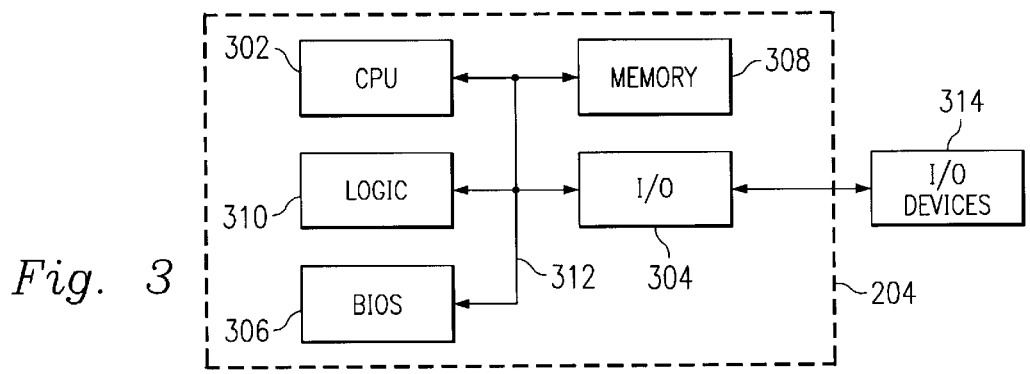
FIG. 3 is a block diagram of a computer of the computing system of FIG. 2.

FIG. 3 is a block diagram of computer 204, which is formed by various electronic circuitry components. Accordingly, as shown in FIG. 3, computer 204 includes a central processing unit ("CPU") 302 for executing and otherwise processing instructions, input/output ("I/O") controller circuitry 304, a basic input output system ("BIOS") electrically erasable programmable read only memory device ("EEPROM") 306 for storing information (e.g. firmware instructions), a memory 308 such as random access memory device ("RAM") and read only memory device ("ROM") for storing information (e.g. instructions executed by CPU 302 and data operated upon by CPU 302 in response to such instructions), and other miscellaneous electronic circuitry logic 310 for performing other operations of computer 204, all coupled to one another through one or more buses 312. Also, computer 204 may include various other components that, for clarity, are not shown in FIG. 3.

As shown in FIG. 3, I/O controller circuitry 304 is coupled to I/O devices 314. I/O devices 314 include, for example, input devices 206, display device 208, print device 210, floppy diskette 212, hard disk 211, and network 112. Accordingly, I/O controller circuitry 304 includes the network interface circuitry (as discussed hereinabove in connection with FIGS. 1 and 2) and other controller circuitry for operating I/O devices 314, reading information from I/O devices 314, and writing information to I/O devices 314.

Computer 204 operates its various components (e.g. I/O controller circuitry 304) in response to information stored by BIOS 306. For example, I/O controller circuitry 304 outputs various interrupt requests ("IRQs"), and computer 204 reacts to such IRQs in response to information stored by BIOS 306. Accordingly, by suitably modifying information stored by BIOS 306, one or more components of computer 204 may be effectively disabled, so that computer 204 operates without reference to such components. In such a situation where a component is disabled, computer 204 would not react to an IRQ from such a disabled component, and computer 204 would not allocate resources to such a disabled component.

A computer, such as computer 204, is "booted" (or "rebooted") when it initiates execution of operating system software (e.g. Microsoft Windows) in response to an event ("boot event"). Such a boot event may be, for example, user 202 "turning on" computer 204 (e.g. user 202 causing application of electrical power to computer 204 by switching an on/off button of computer 204). Alternatively, such a boot event may be receipt by computer 204 of a command to initially execute the operating system software. For example, computer 204 may receive such a command from user 202 (e.g. through input devices 206), or from a computer application executed by computer 204, or from another computer (e.g. from server 110 through network 112).

I/O controller circuitry 304 outputs signals to hard disk 211, and hard disk 211 receives, stores and/or outputs such information in response to such signals. Such information includes a master boot record MBR. In accordance with the IBM-compatible PC architecture, the MBR is the first sector (cylinder 0, head 0, sector 1) on hard disk 211. A sector is the smallest individually addressable unit of storage on a hard disk. Under the IBM-compatible PC architecture, hard disks have a sector size of 512 bytes.

The MBR includes bootstrap instructions BI and a master partition table MPT for managing disk storage. In accordance with the IBM-compatible PC architecture, the MPT includes four partition table entries, namely PTE1, PTE2, PTE3 and PTE4. A partition table entry PTEx (where x=1, 2, 3 or 4) includes information that describes the size, location, and type (extended, new technology file system ("NTFS"), 16-bit or 32-bit file allocation table ("FAT"), primary or utility) of a partition Px of hard disk 211 that is associated with such PTEx.

Notably, in response to booting (or rebooting) computer 204:

(a) computer 204 reads instructions into memory 308: (i) from BI; and (ii) from a partition boot record PBRx if partition table entry PTEx is marked as "active;" and (b) executes such instructions in response to information stored by BIOS 306.

More particularly, PBRx is the partition boot record of Px, which is the partition associated with PTEx. In the illustrative embodiment, a PBRx is a single sector of information. BI and each PBRx include instructions according to the operating system software's type, version, and language.

Notably, a new hard disk normally is blank and does not contain partitioning information. As part of a high volume computer assembly or manufacturing operation, blank hard disks are installed in a large number of computing systems, such as computing systems 102, 104, 106 and 108. In that situation, computing systems 102, 104, 106 and 108 prepare their respective hard disks in response to various information (e.g. instructions, data). Much of such information is received by computing systems 102, 104, 106 and 108 from server 110 through network 112.

For example, if hard disk 211 is blank and is installed in representative computing system 200, and computer 204 is booted (e.g. in response to instructions stored on floppy diskette 212), then computer 204 recognizes the lack of partitions on hard disk 211. In that situation, computer 204 initializes (e.g. prepares) hard disk 211 by formatting it and suitably adding, modifying or deleting one or more partitions on it. In the illustrative embodiment, such initialization is part of a process executed by computer 204 to install files and information structures on hard disk 211 for supporting various devices of computing system 200.

Computer 204 performs such a process, at least in part, in response to information received by computer 204 from server 110 through network 112. Accordingly, in response to such information from server 110, computer 204 (a) initializes (e.g. writes information to) hard disk 211, (b) initializes the information structures of hard disk 211 for identifying logical drives, and (c) performs other actions, such as installing software files, for preparing hard disk 211.

Figure 4:
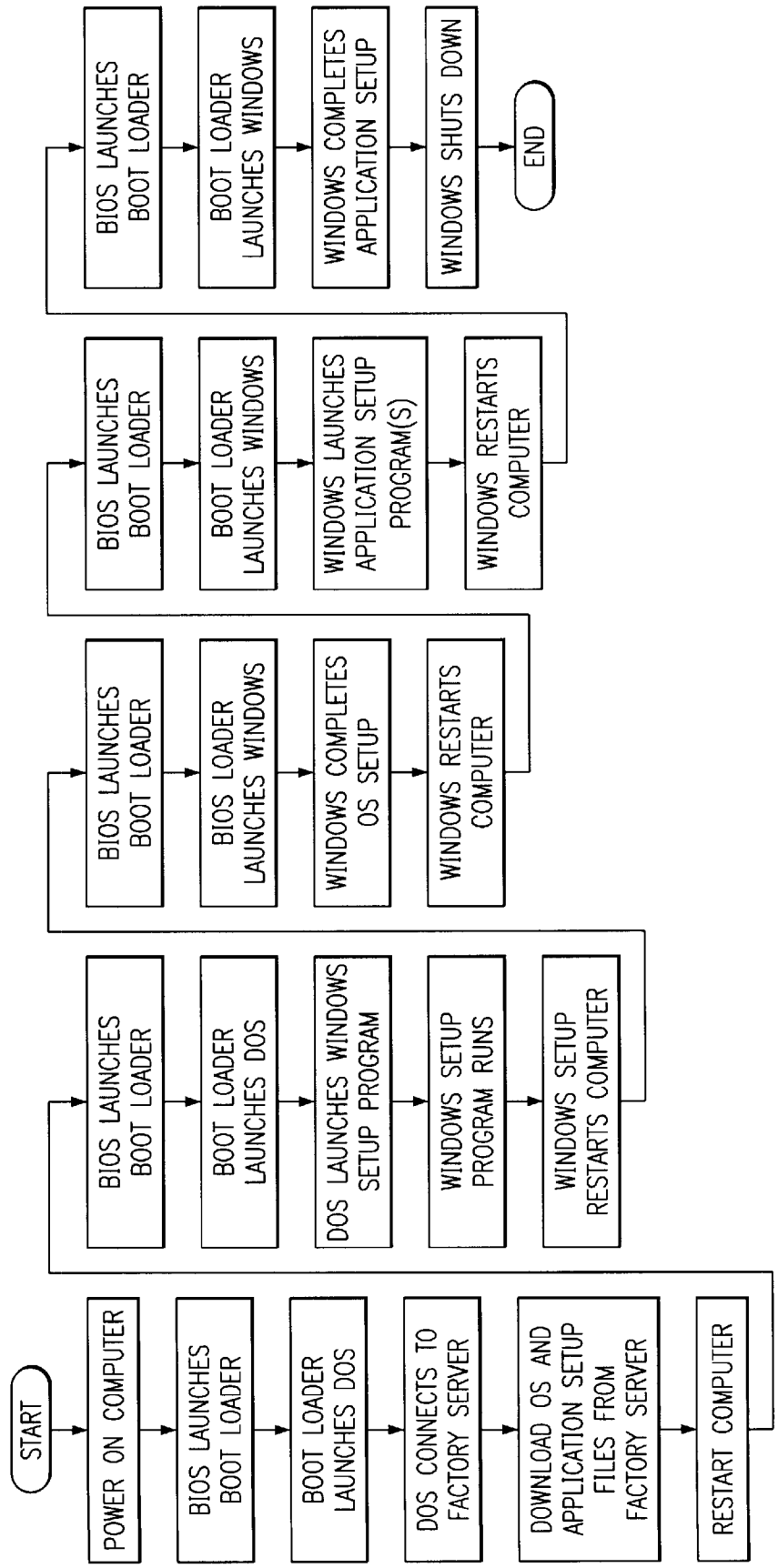
FIG. 4 is a flowchart of operation of the representative computing system of FIG. 2 in performing a "build-to-order" preparation of its hard disk.

FIG. 4 is a flowchart of operation of representative computing system 200 in performing a "build-to-order" preparation of its hard disk 211. In FIG. 4, all of the stated operations are performed by computer 204 in response to instructions from various software referenced in FIG. 4. For example, in stating that "BIOS launches Boot Loader," the meaning is that "computer 204 launches Boot Loader in response to instructions of BIOS." In reviewing FIG. 4, the following list of meanings (specific to FIG. 4) is helpful.

| | |
|---|---|
| "computer" | computer 204 |
| "BIOS" | BIOS 306 |
| "launches" | initiates execution of |
| "Boot Loader" | bootstrap instructions BI |
| "DOS" | Microsoft DOS operating system software |
| "connects to" | communicates with |
| "Factory Server" | server 110 |
| "OS" | DOS and Microsoft Windows 95 operating system software |
| "Application Setup Files" | the install package source files, .MSI files, Microsoft Windows Installer software & files (e.g. .DLL files) that specify other actions (e.g. custom actions) as identified in .MSI files |
| "Restart" | reboot |
| "Windows" | Microsoft Windows 95 operating system software |
| "Runs" | is executed by computer 204 |
| "Application Setup Program(s)" | Microsoft Windows Installer software & files (e.g. .DLL files) that specify other actions (e.g. custom actions) as identified in .MSI files |
| "Application Setup" | execution of Application Setup Program(s) |

In the process of computer 204 initiating execution of DOS in response to instructions of Boot Loader (bootstrap instructions BI), if DOS is initially absent from hard disk 211, then computer 204 reads DOS from floppy diskette 212.

Figure 5:
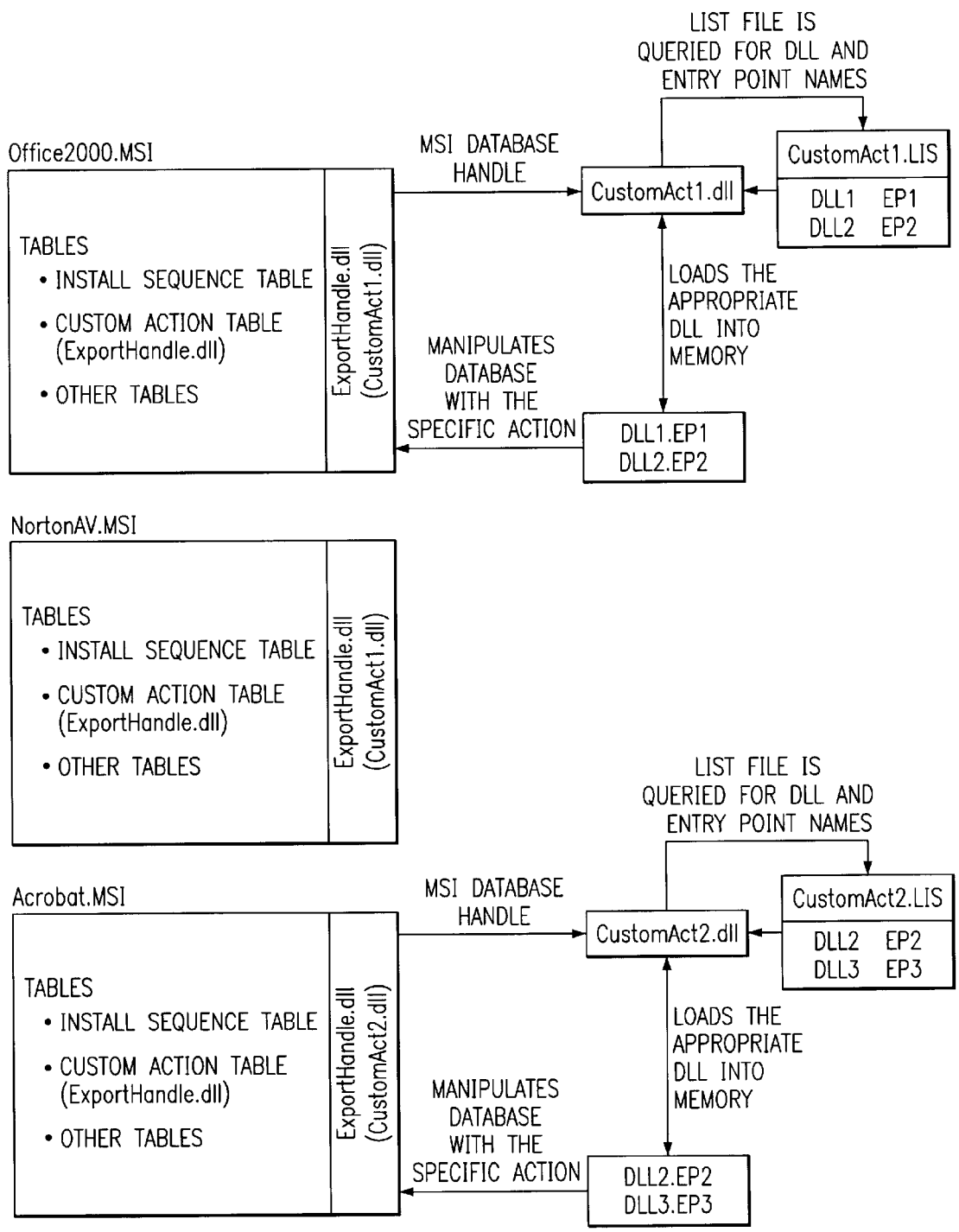
FIG. 5 is a conceptual illustration of .MSI files, .DLL files, and .LIS files of the illustrative embodiment.

FIG. 5 is a conceptual illustration of .MSI files (i.e. Microsoft Windows Installer installation files), .DLL files, and .LIS files of the illustrative embodiment. A .DLL file is a Dynamic Link Library, which is an executable program file with instructions for causing a computer to perform a function. .DLL files are not launched directly by a human user. Instead, a computer initiates execution of a .DLL file in response to the computer's execution of other software.

Each .MSI file is associated with a respective software application (e.g. as shown in FIG. 5, "Office2000.MSI" file is associated with Microsoft Office 2000 software, "NortonAV.MSI" file is associated with Norton AntiVirus software, and "Acrobat.MSI" file is associated with Adobe Acrobat software). Moreover, each .MSI file includes a respective set of tables, which are stored in a relational database format, for specifying the manner in which computer 204 is to install the .MSI file's respectively associated software application onto a target partition of hard disk 211. Accordingly, in response to (and in accordance with) the .MSI file, computer 204 installs the .MSI file's respectively associated software application onto the target partition.

Examples of the .MSI file's tables include:

(a) Install Sequence Table for specifying a selection and order of installation operations to be executed by computer 204 for installing the .MSI file's respectively associated software application onto the partition of hard disk 211, including the operations of (i) verifying whether the partition has adequate space remaining to store particular software files that are specified by the .MSI file (e.g. by the .MSI file's Feature Table, Component Table, Directory Table, File Table) for installation onto the partition of hard disk 211, and (ii) executing custom actions that are specified by the .MSI file's Custom Action Table;

(b) Custom Action Table for specifying custom actions (e.g. .DLL files) to be executed by computer 204 for installing the .MSI file's respectively associated software application onto the partition of hard disk 211; and (c) other tables, such as:
  (i) Properties Table for specifying general information, such as version number, product identification code, and company name;
  (ii) Media Table for specifying types of media (e.g. CD-ROM, network, hard disk) from which files are to be copied by computer 204 for installing the .MSI file's respectively associated software application onto the partition of hard disk 211;
  (iii) Feature Table;
  (iv) Component Table;
  (v) Feature/Component Table;
  (vi) File Table;
  (vii) Directory Table;
  (viii) Conditional Table;
  (ix) Registry Table;
  (x) INItialization File Table;
  (xi) Font Table; and
  (xii) Services Table.

Advantageously, many commercially available software applications include vendor-supplied installation packages (e.g. install package source files and .MSI files), that are designed for use with commercially available Microsoft Windows Installer software. During the application setup operation (FIG. 4), computer 204 reads .MSI file names from a Microsoft Windows operating system registry files on hard drive 211. For such .MSI files, computer 204 executes the Microsoft Windows Installer software as part of the application setup operation.

Accordingly, computer 204 executes Microsoft Windows Installer software for installing (or "copying") particular software files onto the partition of hard disk 211 in response to (a) instructions of the Microsoft Windows Installer software and (b) information of the .MSI files (e.g. as specified by the .MSI file's Feature Table, Component Table, Directory Table, File Table). During such installation, computer 204 copies those specified particular software files from install package source files.

In the illustrative embodiment, computer 204 receives the install package source files from server 110 through network 112, together with (a) .MSI files and (b) additional files (e.g. .DLL files, .LIS files) that specify other actions (e.g. custom actions) as identified in the .MSI files. Accordingly, by varying the install package source files and .MSI files received by a particular one of computing systems 102, 104, 106 and 108, such computing systems can be "built-to-order" independent of (and different from) one another, each selectively installing different files onto its respective hard disk. On a particular computing system-by-computing system basis, in the illustrative embodiment, such variation of files is achievable by server 110 selectively transmitting (or "outputting") .MSI files (and associated install package source files) to the particular computing system through network 112, independent of .MSI files (and associated install package source files) that server 110 transmits to another computing system through network 112.

Notably, Microsoft Windows Installer software supports custom (or "programmable") actions in response to information in an .MSI file's Custom Action Table, and in accordance with the order (or "sequence") specified in the .MSI file's Install Sequence Table. With such custom actions, it is possible to modify the manner in which computer 204 installs the .MSI file's associated respective software application onto the target partition of hard disk 211.

Examples of custom actions include (a) revising a letter (e.g. "D") associated with a Compact Disc Read Only Memory ("CD-ROM") drive of computing system 200, (b) revising specific workstation information, such as the workstation's Internet Protocol ("IP") address, and (c) executing other customized instructions.

In the illustrative embodiment, custom actions may be specified by:

(a) instructions in a compiled executable .DLL file stored within the .MSI file;

(b) instructions in a compiled executable .DLL file stored external to the .MSI file, as for example received (by computer 204 from server 110 through network 112) along with the .MSI file and its associated install package source files;

(c) instructions in a compiled executable .EXE file stored within the .MSI file;

(d) instructions in a compiled executable .EXE file stored external to the .MSI file, as for example received (by computer 204 from server 110 through network 112) along with the .MSI file and its associated install package source files;

(e) instructions in a compiled executable .EXE file already stored on hard disk 211, as for example specified by a property value;

(f) instructions in an interpreted executable Java script file;

(g) instructions in an interpreted executable Visual Basic script file;

(h) a property value as specified by one or more formatted alphanumeric characters; or (i) a directory value as specified by one or more formatted alphanumeric characters.

In the following discussion, a .DLL file is a representative one of options (a) through (g) above. With any of options (a) through (g) above, it is possible for a user (e.g. user 202) to programmatically modify the manner in which computer 204 installs the .MSI file's associated respective software application onto the target partition of hard disk 211. Computer 204 executes such programmatic modification by revising one or more of the tables in the .MSI file itself in response to the user-programmed instructions of such programming.

As mentioned hereinabove, such tables are stored in a relational database format on hard disk 211. Accordingly, computer 204 is able to revise such tables in response to (a) custom action instructions and (b) a database handle (or "key") generated by the Microsoft Windows Installer software. In one embodiment, the database handle has a format of MSIxyz, where x, y and z are alphanumeric variables.

If the custom action is specified by instructions in a file stored within the .MSI file, the Microsoft Windows Installer software is programmed to share the database handle with such an internal file (even for the purpose of revising the .MSI file). With the database handle, computer 204 is able to effectively revise the .MSI file in response to instructions in such an internal file. Nevertheless, in order to specify the custom action by such an internal file, the .MSI file itself is statically revised beforehand to include such an internal file. In that situation, if several .MSI files have the same custom action, a revision to the custom action would compel individual revision of those several .MSI files, which is tedious and inefficient.

Preferably, the custom action is specified by instructions in a file stored external to the .MSI file. In that manner, if several of the .MSI files have the same custom action, those several .MSI files may specify a single external file as the source of instructions for executing the custom action, even though such .MSI files could differ from one another in other aspects. Accordingly, in that situation, a revision to the custom action would compel individual revision of only the single external file, without compelling individual revision of the several .MSI files that have the same custom action.

Nevertheless, if the custom action is specified by instructions in a file stored external to the .MSI file, the Microsoft Windows Installer software is programmed to withhold the database handle from such an external file (at least for the purpose of revising the .MSI file). Without the database handle, computer 204 is unable to effectively revise the .MSI file in response to instructions in such an external file.

Referring to FIG. 5, in a significant aspect of the illustrative embodiment, each .MSI file includes a simple ExportHandle.DLL file. The .MSI file's Custom Action Table specifies the internal (ExportHandle.DLL) file to be executed by computer 204 for installing the .MSI file's respectively associated software application onto the partition of hard disk 211. In that manner, the custom action is specified by instructions in the internal (ExportHandle.DLL) file, which is stored within the .MSI file, and the Microsoft Windows Installer software accordingly shares the database handle with such an internal file.

For example, in executing the Microsoft Windows Installer software, computer 204 receives the database handle when such software instructs computer 204 to initiate execution of the internal (ExportHandle.DLL) file during the processing of a particular .MSI file. Moreover, in another significant aspect of the illustrative embodiment, the internal (ExportHandle.DLL) file has at least one instruction that specifies a simple CustomActN.DLL file (where N is an integer number, as shown in FIG. 5). Notably, the CustomActN.DLL file is stored external to the .MSI file.

Accordingly, in response to instructions of the internal (ExportHandle.DLL) file, computer 204 initiates execution of (and passes the database handle to) the external (CustomActN.DLL) file. In yet another significant aspect of the illustrative embodiment, the CustomActN.DLL file is associated with a CustomActN.LIS file (likewise stored external to the particular .MSI file). The CustomActN.LIS file includes a list of names of additional .DLL files, together with .EP (entry point) locations within such additional .DLL files.

In response to instructions of the CustomActN.DLL file, computer 204 (a) queries the associated CustomActN.LIS file for names of such additional .DLL files and .EP locations within such additional .DLL files and (b) initiates execution of (and passes the database handle to) such .EP locations within such additional .DLL files (e.g. DLL1.EP1). In response to the database handle and to instructions of such .EP locations within such additional .DLL files, computer 204 revises the particular .MSI file. By revising the particular .MSI file in that manner, computer 204 programmatically modifies the manner in which it installs the .MSI file's associated respective software application onto the target partition of hard disk 211.

In the example of FIG. 5, the Office2000.MSI file and NortonAV.MSI file have the same custom action. Accordingly, in each of those .MSI files, the respective ExportHandle.DLL file specifies the same CustomAct1.DLL file, even though Office2000.MSI and NortonAV.MSI could differ from one another in other aspects. In that situation, a revision to the custom action for Office2000.MSI and NortonAV.MSI would compel individual revision of only the single external CustomAct1.LIS file (associated with the CustomAct1.DLL file), without compelling individual revision of the Office2000.MSI and NortonAV.MSI files themselves.

For example, server 110 is able to revise CustomAct1.LIS by deleting or modifying one or more of the DLL1, DLL2, EP1 and EP2 names, or by adding one or more additional names within CustomAct1.LIS. For a representative computing system (e.g. computing system 200), such revision would be effective when computer 204 receives the install package source files from server 110 through network 112, together with (a) .MSI files and (b) the additional files (e.g. .DLL files, .LIS files) which specify other actions (e.g. custom actions) as identified in the .MSI files.

By comparison, in the example of FIG. 5, the Acrobat- .MSI file has a different custom action relative to the Office2000.MSI and NortonAV.MSI files. Accordingly, in the Acrobat.MSI file, the respective ExportHandle.DLL file specifies a CustomAct2.DLL file, which may also be specified by the respective ExportHandle.DLL files of other .MSI files (having the same custom action as Acrobat.MSI). In that situation, a revision to the custom action for Acrobat- .MSI (and such other .MSI files) would compel individual revision of only the single external CustomAct2.LIS file (associated with the CustomAct2.DLL file), without compelling individual revision of the Acrobat.MSI file itself (or of such other .MSI files).

For revising an .MSI file to specify ExportHandle.DLL as a custom action in the Custom Action Table and to include the ExportHandle.DLL file (e.g. including its instructions) within the .MSI file, server 110 executes a group of instructions that calls a Microsoft Windows Installer application program interface ("API") of the Microsoft Windows Installer software. Such group of instructions is part of a Microsoft Windows Installer software developer's kit ("SDK") software package, which is freely available from Microsoft Corporation. Server 110 is able to initiate execution of such group of instructions before initiating execution of the Microsoft Windows Installer package. During execution of such group of instructions by server 110, such group of instructions may call the Microsoft Windows Installer API for instructing server 110 to initiate execution of the Microsoft Windows Installer software.

To ensure consistency between an instruction file (e.g. .DLL file, .EXE file) and other files of system 100, server 110 ensures that: (a) if such instruction file is compiled, then it is compiled for the same version of the Microsoft Windows Installer software as such other files; and (b) even if such instruction file is not compiled (e.g. if interpreted), then it is coded for the same version of the Microsoft Windows Installer software as such other files.

Referring again to FIG. 2, computer-readable medium 212 is a floppy diskette. Computer-readable medium 212 and computer 204 are structurally and functionally interrelated with one another as described further hereinbelow. Each computing device of the illustrative embodiment is structurally and functionally interrelated with a respective computer-readable medium, similar to the manner in which computer 204 is structurally and functionally interrelated with computer-readable medium 212. In that regard, computer-readable medium 212 is a representative one of such computer-readable media, including for example but not limited to storage device 211.

Computer-readable medium 212 stores (or encodes, or records, or embodies) functional descriptive material (e.g. including but not limited to software (also referred to as computer programs or applications) and data structures). Such functional descriptive material imparts functionality when encoded on computer-readable medium 212. Also, such functional descriptive material is structurally and functionally interrelated to computer-readable medium 212.

Within such functional descriptive material, data structures define structural and functional interrelationships between such data structures and computer-readable medium 212 (and other aspects of computer 204, computing system 200 and system 100). Such interrelationships permit the data structures' functionality to be realized. Also, within such functional descriptive material, computer programs define structural and functional interrelationships between such computer programs and computer-readable medium 212 (and other aspects of computer 204, computing system 200 and system 100). Such interrelationships permit the computer programs' functionality to be realized.

For example, computer 204 reads (or accesses, or copies) such functional descriptive material from computer-readable medium 212 into the memory device of computer 204, and computer 204 performs its operations (as described elsewhere herein) in response to such material which is stored in the memory device of computer 204. More particularly, computer 204 performs the operation of processing a computer application (that is stored, encoded, recorded or embodied on a computer-readable medium) for causing computer 204 to perform additional operations (as described elsewhere herein). Accordingly, such functional descriptive material exhibits a functional interrelationship with the way in which computer 204 executes its processes and performs its operations.

Further, the computer-readable medium is an apparatus from which the computer application is accessible by computer 204, and the computer application is processable by computer 204 for causing computer 204 to perform such additional operations. In addition to reading such functional descriptive material from computer-readable medium 212, computer 204 is capable of reading such functional descriptive material from (or through) network 112 which is also a computer-readable medium (or apparatus). Moreover, the memory device of computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing system, comprising:
   at least one computer-readable medium for storing information including:
     at least one installation file including at least one instruction and at least one table; and
     at least one programmable file that is executable and is specified by the instruction; and a computing device for:
  initiating execution of an installation program for installing at least a portion of the information onto the computing system in response to the installation file;
  in the execution of the installation program, executing the instruction;
  in response to the instruction specifying the programmable file, executing the programmable file for revising the table; and
  in the execution of the installation program, installing at least the portion of the information onto the computing system in response to the revised table of the installation file.

2. The computing system of claim 1 wherein the portion is for installation onto the computer-readable medium of the computing system.

3. The computing system of claim 2 wherein the portion includes at least one software file for installation onto the computer-readable medium of the computing system.

4. The computing system of claim 3 wherein the software file is associated with a software application for installation onto the computer-readable medium of the computing system.

5. The computing system of claim 1 wherein the programmable file is a .DLL file.

6. The computing system of claim 1 wherein the programmable file is an .EXE file.

7. The computing system of claim 1 wherein the programmable file is a Java script file.

8. The computing system of claim 1 wherein the programmable file is a Visual Basic script file.

9. The computing system of claim 1 wherein the computer-readable medium is a hard disk.

10. The computing system of claim 1 wherein the computer-readable medium is a floppy diskette.

11. The computing system of claim 1 wherein the programmable file is stored external to the installation file.

12. The computing system of claim 11 wherein the computing device is for:
  executing the instruction and receiving a key in response thereto; and
  executing the programmable file for revising the table in response to the key.

13. A method performed by a computing system, comprising:
  on at least one computer-readable medium, storing information including:
    at least one installation file including at least one instruction and at least one table; and
    at least one programmable file that is executable and is specified by the instruction; and
  initiating execution of an installation program for installing at least a portion of the information onto the computing system in response to the installation file;
  in the execution of the installation program, executing the instruction;
  in response to the instruction specifying the programmable file, executing the programmable file for revising the table; and
  in the execution of the installation program, installing at least the portion of the information onto the computing system in response to the revised table of the installation file.

14. The method of claim 13 wherein the installing comprises installing the portion onto the computer-readable medium of the computing system in response to the revised table of the installation file.

15. The method of claim 14 wherein the installing comprises installing at least one software file of the portion onto the computer-readable medium of the computing system in response to the revised table of the installation file.

16. The method of claim 15 wherein the installing comprises installing a software application onto the computer-readable medium of the computing system in response to the revised table of the installation file, the software file being associated with the software application.

17. The method of claim 13 wherein the storing comprises storing the information, the programmable file being a .DLL file.

18. The method of claim 13 wherein the storing comprises storing the information, the programmable file being an .EXE file.

19. The method of claim 13 wherein the storing comprises storing the information, the programmable file being a Java script file.

20. The method of claim 13 wherein the storing comprises storing the information, the programmable file being a Visual Basic script file.

21. The method of claim 13 wherein the storing comprises storing the information, the computer-readable medium being a hard disk.

22. The method of claim 13 wherein the storing comprises storing the information, the computer-readable medium being a floppy diskette.

23. The method of claim 13 wherein the storing comprises storing the programmable file external to the installation file.

24. The method of claim 23 wherein the executing of the instruction comprises executing the instruction and receiving a key in response thereto; and wherein the executing of the programmable file comprises executing the programmable file for revising the table in response to the key.

* * * * *